(12) United States Patent
Sood et al.

(10) Patent No.: US 11,048,800 B2
(45) Date of Patent: Jun. 29, 2021

(54) COMPOSABLE TRUSTWORTHY EXECUTION ENVIRONMENTS

(71) Applicant: Intel Corporation, Santa Clara, CA (US)

(72) Inventors: Kapil Sood, Portland, OR (US); Ioannis T. Schoinas, Portland, OR (US); Yu-Yuan Chen, Chandler, AZ (US); Raghunandan Makaram, Northborough, MA (US); David J. Harriman, Portland, OR (US); Baiju Patel, Portland, OR (US); Ronald Perez, Piedmont, CA (US); Matthew E. Hoekstra, Forest Grove, OR (US); Reshma Lal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 16/362,218

(22) Filed: Mar. 22, 2019

(65) Prior Publication Data
US 2019/0220601 A1 Jul. 18, 2019

Related U.S. Application Data

(60) Provisional application No. 62/780,643, filed on Dec. 17, 2018.

(51) Int. Cl.
*G06F 21/57* (2013.01)
*G06F 9/50* (2006.01)
(Continued)

(52) U.S. Cl.
CPC .............. *G06F 21/57* (2013.01); *G06F 9/505* (2013.01); *G06F 21/53* (2013.01); *G06F 21/72* (2013.01);
(Continued)

(58) Field of Classification Search
None
See application file for complete search history.

(56) References Cited

U.S. PATENT DOCUMENTS 6,631,354 B1 * 10/2003 Leymann ............... G06Q 10/10
705/7.26
9,584,517 B1 * 2/2017 Roth ................... G06F 21/6209
(Continued)

FOREIGN PATENT DOCUMENTS

KR 102105760 B1 * 4/2020

OTHER PUBLICATIONS

Schuster, Felix et al., "VC3: Trustworthy Data Analytics in the Cloud using SGX", 2015 IEEE Symposium on Security and Privacy, pp. 38-54. (Year: 2015).*
(Continued)

*Primary Examiner* — Michael Pyzocha
(74) *Attorney, Agent, or Firm* — Alliance IP, LLC

(57) ABSTRACT

In one embodiment, an apparatus comprises a processor to: receive a request to configure a secure execution environment for a first workload; configure a first set of secure execution enclaves for execution of the first workload, wherein the first set of secure execution enclaves is configured on a first set of processing resources, wherein the first set of processing resources comprises one or more central processing units and one or more accelerators; configure a first set of secure datapaths for communication among the first set of secure execution enclaves during execution of the first workload, wherein the first set of secure datapaths is configured over a first set of interconnect resources; configure the secure execution environment for the first workload, wherein the secure execution environment comprises the first set of secure execution enclaves and the first set of secure datapaths.

25 Claims, 7 Drawing Sheets

(51) Int. Cl.
  *G06F 21/85* (2013.01)
  *G06F 21/72* (2013.01)
  *G06F 21/53* (2013.01)
(52) U.S. Cl.
  CPC ........ *G06F 21/85* (2013.01); *G06F 2221/034* (2013.01)

(56) References Cited

U.S. PATENT DOCUMENTS

| | | | |
|---|---|---|---|
| 2016/0171248 A1* | 6/2016 | Nesher | G06F 21/53 713/190 |
| 2016/0381005 A1* | 12/2016 | Vij | G06F 21/57 726/7 |
| 2017/0083724 A1* | 3/2017 | Chhabra | G06F 12/1408 |
| 2018/0137299 A1* | 5/2018 | Porter | G06F 21/64 |
| 2018/0183581 A1 | 6/2018 | Elbaz et al. | |
| 2018/0232517 A1* | 8/2018 | Roth | H04L 63/10 |
| 2019/0052617 A1 | 2/2019 | Chen et al. | |
| 2019/0220617 A1 | 7/2019 | Harriman et al. | |
| 2019/0281025 A1 | 9/2019 | Harriman et al. | |
| 2020/0092263 A1* | 3/2020 | Rohera | H04L 9/0866 |
| 2020/0372166 A1* | 11/2020 | Porter | G06F 21/6245 |
| 2021/0034788 A1* | 2/2021 | Savagaonkar | G06F 21/602 |

OTHER PUBLICATIONS

European Telecommunications Standards Institute, "ESTI GS NFV 001 V1.1.1, Group Specification, Network Functions Virtualisation (NFV) Use Cases", Oct. 2013 (50 pages).

European Telecommunications Standards Institute, "ESTI GS NFV 002 V1.1.1, Group Specification, Network Functions Virtualisation (NFV); Architectural Framework," Oct. 2013 (21 pages).

European Telecommunications Standards Institute, "ETSI GS NFV-SEC 009 V 1.1.1, Group Specification, Network Functions Virtualisation (NFV); NFV Security; Report in Use Cases and Technical Approaches for Multi-Layer Host Administration," Dec. 2015 (49 pages).

European Telecommunications Standards Institute, "ETSI GS NFV-SEC 013 V3 1.1, Network Functions Virtualisation (NVF) Release 3; Security Management and Monitoring Specification," Feb. 2017 (54 pages).

* cited by examiner

COMPOSABLE TRUSTWORTHY EXECUTION ENVIRONMENTS

CROSS-REFERENCE TO RELATED APPLICATIONS

This patent application claims the benefit of the filing date of the following patent application, the content of which is hereby expressly incorporated by reference: U.S. Provisional Patent Application Ser. No. 62/780,643, filed on Dec. 17, 2018, entitled "DYNAMIC, SCALABLE, AND COMPOSE-ABLE TRUSTWORTHY EXECUTION ENVIRONMENTS."

FIELD OF THE SPECIFICATION

This disclosure relates in general to the field of secure execution environments, and more particularly, though not exclusively, to composable trustworthy execution environments (CTEEs) for heterogeneous and/or multi-tenant workloads.

BACKGROUND

Secure execution environments can be leveraged to protect the integrity and/or confidentiality of workloads executed on certain general-purpose processors, such as x86 or ARM-based central processing units (CPUs). It has become increasingly common, however, for workloads to extend beyond general-purpose processors onto special-purpose processors and accelerators. For example, various functions of the same workload may be designed to execute across a variety of heterogeneous processing components, such as a combination of CPUs and accelerators. Currently, however, secure execution environments are limited to workloads that are confined to certain general-purpose processors, and they cannot extend onto additional special-purpose processors or accelerators.

EMBODIMENTS OF THE DISCLOSURE

Figure 1:
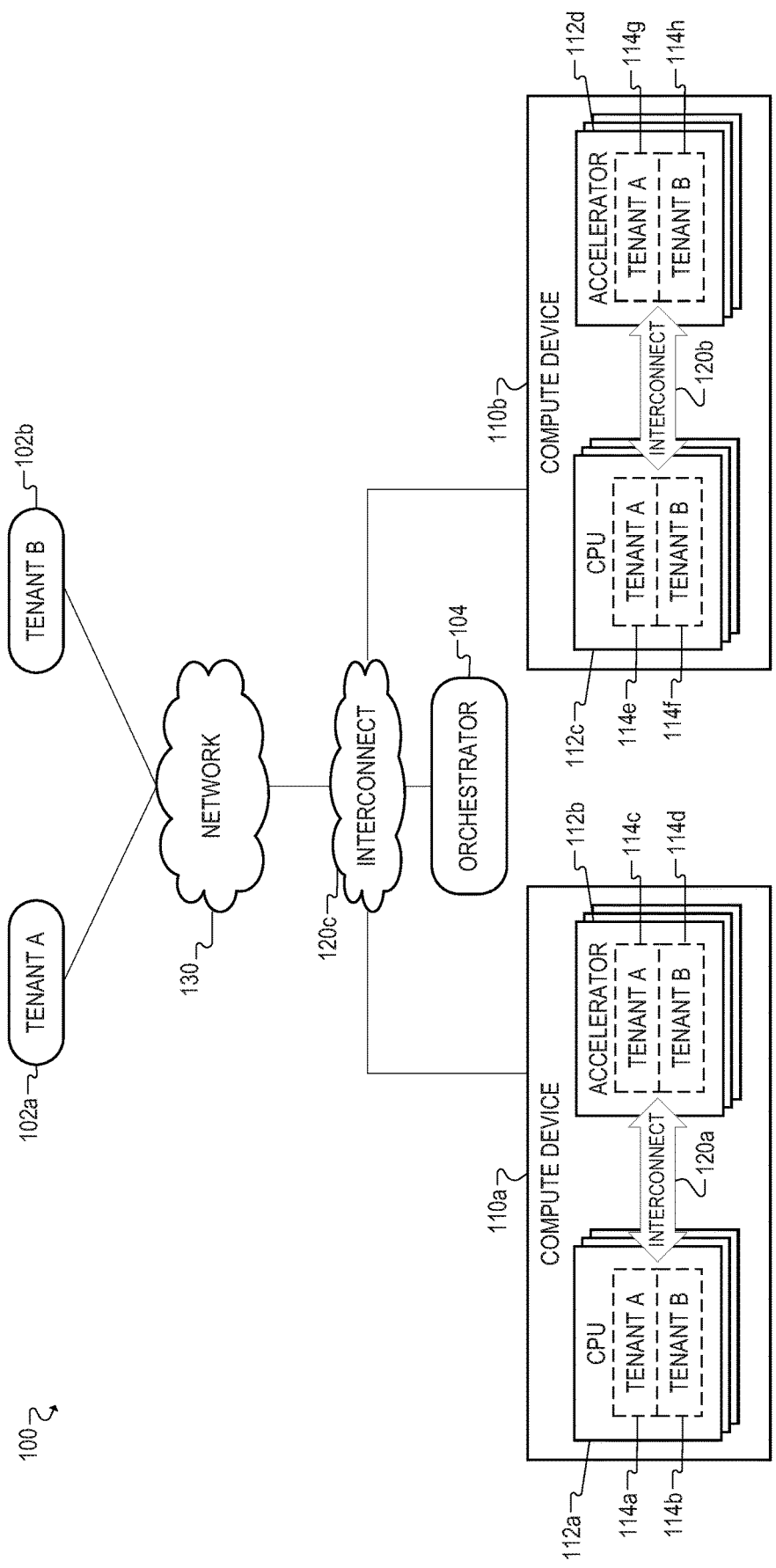
FIG. 1 illustrates an example computing system with composable trustworthy execution environments (CTEEs).

This patent application claims the benefit of the filing date of the following patent application, the content of which is hereby expressly incorporated by reference: U.S. Provisional Patent Application Ser. No. 62/780,643, filed on Dec. 17, 2018, entitled "DYNAMIC, SCALABLE, AND COMPOSE-ABLE TRUSTWORTHY EXECUTION ENVIRONMENTS."

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Composable Trustworthy Execution Environments

Secure execution environments (e.g., trusted execution environments (TEEs) and/or hardware-mediated execution enclaves (HMEEs)) can be leveraged to protect the integrity and/or confidentiality of workloads executed on certain computing platforms. These secure execution environments, however, are limited to certain general-purpose processors running compute-only instruction sets, such as x86 or ARM instruction sets. For example, secure execution environments can be leveraged on Intel x86 processors with Intel Software Guard Extensions (SGX) technology, AMD x86 processors with AMD Secure Encrypted Virtualization-Encrypted State (SEV-ES) technology, and ARM processors with ARM TrustZone technology.

Current workloads, however, increasingly extend beyond general-purpose processors onto special-purpose processors and accelerators, such as cryptography accelerators, compression accelerators, graphics accelerators, artificial intelligence (AI) and inferencing engines, smart network interface controllers (SmartNICs), and other custom or special-purpose circuitry implemented using field-programmable gate arrays (FPGAs), application-specific integrated circuits (ASICs), or other types of programmable or fixed-function integrated circuits. As these workloads extend beyond general-purpose processors, it is crucial to maintain their trust and/or security, as various functions of the same workload are now executed across multiple processing components.

Traditional secure execution technologies define static compute-hardware-only execution environments, however, which do not scale for current and expected usages, nor for heterogeneous workloads that are latency and security sensitive and require trust extensions to specialized accelerators. Further, because the boundaries of these traditional solutions are static, they are unable to grow or scale per the requirements of current workloads, which are evolving from traditional virtual machines (VMs) to containers to highly specialized microservices and/or Function-as-a-Service (FaaS) models.

For example, while various secure execution technologies are available solely for CPU or compute-only workloads (e.g., Intel SGX, AMD SEV-ES, and ARM TrustZone), no current solutions are capable of extending the trust of a compute-only execution environment to accelerators. Further, current solutions do not scale secured execution across multiple hardware components and do not comprehend a secured interconnect model, where per-tenant workload execution messages are protected (e.g., service mesh sidecar communication using the ISTIO service mesh platform) as workloads (e.g., FaaS workloads) run on different components. As an example, ARM TrustZone technology enables trusted execution environments (TEEs) to be defined solely for compute-only workloads (e.g., workloads that are confined to ARM-based processors without extending to any accelerators), and in most deployments these TEEs do not create per-tenant isolation within their respective "Trust-Zones." Thus, current solutions are unable to extend per-tenant secured isolation execution environments across multiple components, which is needed for containerized and FaaS software models, where software functions are executed on specialized hardware components for better efficiency and lower cost.

For example, the evolution of software workloads is moving at an exceedingly fast pace, from monolithic virtual machines (e.g., using OpenStack) to faster and more efficient containers (e.g., using Kubernetes) to even more efficient microservices models (e.g., Functions-as-a-Service (FaaS), ISTIO and Service Mesh). As a result, individual microservice components are highly specialized and many of them are designed to run on dedicated accelerators. Accordingly, there is a need for a solution that is capable of creating trustworthy execution environments for highly fragmented microservices-based workloads that are designed to run across multiple heterogeneous processing components.

Moreover, the customers of third-party service providers, such as cloud service providers (CSPs) and/or communications service providers (CoSPs), now desire complete isolation of their workloads from the underlying infrastructure on which they run. This is due to critical intellectual property (IP) security, data sovereignty and protection, privacy, emerging regulatory requirements, and emerging concerns regarding workloads being subjected to unauthorized monitoring. These concerns are magnified by the increasingly common trend of running customer workloads on edge deployments, as the underlying infrastructure may be co-hosted in colocations (CoLos) that are not owned by the customers or the service providers that they contracted with (e.g., an Intel workload running on an Amazon Cloud hosted in a Telco infrastructure), and/or may otherwise be deployed in remote base stations, unmanned sites, public locations, and so forth. Accordingly, there is a need for a solution that is capable of creating per-tenant trustworthy execution environments for heterogeneous customer workloads executed on third-party infrastructure.

Accordingly, this disclosure presents various embodiments of dynamic, scalable, and composable trustworthy execution environments (CTEEs) for workloads executed on heterogeneous computing platforms with multiple tenants. For example, the described embodiments leverage a system and architecture with cryptographic protections and access controls to construct CTEEs, which are per-tenant secure execution environments distributed over multiple heterogenous components that are dynamically assembled into a computing platform. In this manner, the CTEEs can be dynamically constructed and scaled to securely execute heterogeneous multi-tenant workloads using a flexible and efficient approach that alleviates the shortcomings of existing solutions.

For example, the described embodiments can be used to dynamically compose a distributed trusted system that includes a collection of general-purpose compute nodes (e.g., x86 and/or ARM-based processors), special-purpose compute nodes (e.g., accelerators, programmable compute nodes, fixed function logic), and memory and storage components. This trusted system can include traditional platform form factors as well as rack-scale architectures and persistent dynamic memory constructions, along with trustworthy logic which may itself be distributed among one or more "roots of trust." The trustworthy logic enables isolated per-tenant execution environments to be composed across multiple heterogenous components of the distributed trusted system, thus allowing heterogenous workloads of multiple tenants to be executed in a secure manner.

This distributed trusted system can be leveraged for orchestration of heterogeneous multi-tenant workloads for a variety of contexts and use cases, such as network function virtualization (NFV) (e.g., based on the ETSI NFV and 5G standards reference architecture), as well as evolving cloud, hybrid cloud, and/or enterprise deployments (e.g., for Platform-as-a-Service (PaaS), Infrastructure-as-a-Service (IaaS), Software-as-a-Service (SaaS), and/or Function-as-a-Service (FaaS) service models), as described further throughout this disclosure.

FIG. 1 illustrates an example computing system 100 with composable trustworthy execution environments (CTEEs) for heterogenous workloads. In the illustrated embodiment, system 100 includes a set of compute devices 110*a-b* in communication with an orchestrator node 104 (e.g., a computing device to assign workloads to the compute devices 110*a-b* for execution) and a set of tenant nodes 102*a-b* (e.g., computing devices of customers for whom workloads are executed by the compute devices 110*a-b*). The compute devices 110*a-b*, the orchestrator node 104, and the tenant nodes 102*a-b* are in communication through a network 130. Network 130 may include any type and/or combination of wired and/or wireless communication networks, including local area networks (LANs), wide area networks (WANs), global networks (e.g., the Internet), cellular networks (e.g., Global System for Mobile Communications (GSM), 3G, 4G Long Term Evolution (LTE), 5G, Worldwide Interoperability for Microwave Access (WiMAX), etc.), radio area networks (RANs), digital subscriber line (DSL) networks, and/or cable networks (e.g., coaxial networks, fiber networks, etc.), among other examples.

In the illustrated embodiment, the compute devices 110*a-b* execute workloads (e.g., set of operations, functions, applications, software components, etc.) on behalf of the tenant compute devices 102*a-b*. In some embodiments, for example, the compute devices 110*a-b* may execute the workloads in corresponding virtualized environments, such as virtual machines or containers (e.g., a lightweight, stand-alone, executable package of software that includes everything needed to run an application, including code, runtime, system tools, system libraries and settings).

Moreover, in some cases, the workloads of the respective tenants 102*a-b* may be designed to execute across a collection of heterogeneous processing components, such as various CPUs 112*a,c* and accelerators 112*b,d* of the compute devices 110*a-b*. Accordingly, in order to execute these multi-tenant heterogeneous workloads in a secure manner, a composable trustworthy execution environment (CTEE) is dynamically created for each workload on the appropriate processing components 112a-d of the compute devices 110a-b.

For example, in the illustrated embodiment, the orchestrator 104 serves as a composition management entity that is responsible for establishing the computing components to be included in a CTEE, performing the required setup operations to create the CTEE, handling any errors associated with the CTEE, and handling the orderly teardown of the CTEE when appropriate. In various embodiments, however, the functionality of the composition management entity may be implemented using any suitable combination hardware and/or software components (e.g., a virtual machine manager (VMM) running on the orchestrator 104 and/or another computing node).

The compute devices 110a-b include a variety of heterogeneous processing components 112a-d (e.g., CPUs and accelerators), and each individual processing component 112a-d is implemented with the capability to create multiple secure execution enclaves 114a-h within itself. In general, the processing components 112a-d can include any combination of general-purpose processors (e.g., CPUs) and special-purpose processors (e.g., accelerators) implemented or embodied in a variety of form factors (e.g., Systems-on-a-Chip (SoCs), CPUs, GPUs, ASICs, FPGAs, and so forth). For example, the processing components 112a-d can include general-purpose compute nodes (e.g., x86 and ARM-based CPUs), GPUs and graphics accelerators, cryptography accelerators, compression accelerators, artificial intelligence (AI) and machine learning (ML) engines, smart network interface controllers (SmartNICs), data storage and security IP blocks, and so forth.

Moreover, each processing component 112a-d is capable of creating multiple secure execution enclaves 114a-h in order to provide cryptographic isolation for all of the mutually distrusting tenant workloads executing on the same hardware. In some embodiments, for example, a secure execution enclave 114a-h may be a trusted execution environment (TEE) and/or a hardware-mediated execution enclave (HMEE) created on a particular processing component 112a-d to provide cryptographic isolation of a workload executing on that processing component. For example, when a particular processing component 112a-d is used to execute multiple workloads of different tenants 102a-b, a separate enclave 114a-h is created on that processing component for each workload. Moreover, when multiple processing components 112a-d are collectively used to execute a single heterogeneous workload, an enclave 114a-h for that workload is created on each of those processing components 112a-d, and those enclaves collectively form a composable trustworthy execution environment (CTEE) for that workload.

In this manner, heterogeneous workloads of different tenants 102a-b can be securely executed across multiple overlapping processing components 112a-d by creating a CTEE for execution of each workload. In the illustrated embodiment, for example, the workload of tenant A 102a is executed in a CTEE that includes enclaves 114a,c,e,g on the respective processing components 112a-d of the compute devices 110a-b. Moreover, the workload of tenant B 102b is executed in another CTEE that includes enclaves 114b,d,f,h on the respective processing components 112a-d of the compute devices 110a-b.

Moreover, each CTEE also includes secure datapaths for communication among its respective enclaves, which are established over one or more interconnects that communicatively couple the underlying processing components containing those enclaves. In the illustrated embodiment, for example, the processing components 112a-d within a particular compute device 110a-b are coupled to each other by an internal interconnect 120a-b, and the compute devices 110a-b themselves are coupled to each other by an external interconnect 120c. Accordingly, the secure datapaths for a particular CTEE can be established over these interconnects 120a-c.

For example, the processing components 112a-d may be interconnected by secured physical interconnects 120a-c running MAC-level security protocols, such as Peripheral Component Interconnect Express (PCIe), Intel Ultra Path Interconnect (UPI), Intel QuickPath Interconnect (QPI), Intel Architecture Link (IAL), ARM's Advanced Extensible Interface (AXI), AMD's Infinity Fabric, and/or any other industry standard and/or proprietary interconnect. These interconnects and/or links connecting secured enclaves can support a variety of configurations, including point-to-point, point-to-multipoint, endpoint devices directly connected to each other, connected/tunneled over a switch, bridge, and/or router, and so forth. Moreover, all payloads are cryptographically protected for confidentiality, integrity, and replay security. The pairwise security associations can be unique for the entire link, or end-point unique based on individual secured enclaves on the processing components on the ends of the link.

In various embodiments, trusted behavior of an interconnect switch, router, and/or bridge may be desirable but not necessarily required. For example, when a switch is within the trust boundary of a tenant, then the switch may include the ability to create a secure enclave and/or datapath that is included in the CTEE for that tenant. Otherwise, the switch may serve as a 'transport' mediation device that is simply used to pass along encrypted traffic (e.g., using tunneling, etc.).

The hardware components in a particular CTEE (e.g., processing components 112a-d and interconnects 120a-c) can be identified using a unique identifier for each component. For example, components that follow the PCIe architecture can be identified using a requestor ID (RID) (e.g., for a PCIe bus, device, or function used in single root input/output virtualization (SR-IOV)), a process address space ID (PASID), and/or another type of ID that is carried in the header (or a prefix to the header) for each packet associated with the corresponding component.

Moreover, each component in a CTEE has the ability to test the security of the CTEE, so as to provide a means for an individual workload to establish appropriate security policies for "self-defense" against other potentially hostile workloads and/or against the underlying management infrastructure itself.

When a suspected security breach is detected by any component of a CTEE, a broadcast notification is sent to all components in the same CTEE and to the composition management entity (e.g., the orchestrator 104). For example, if a suspected security breach is detected at any pairwise connection of the CTEE over the secure interconnects 120a-c, that connection is immediately blocked, and notifications are sent to all components in that CTEE as well as the composition management entity.

In various embodiments, functionality and components of system 100 may be implemented anywhere throughout an edge-to-cloud network topology, including at the edge, in the cloud, and/or anywhere in between (which may be collectively referred to as the "fog"). For example, in some embodiments, some or all of system 100 may be distributed throughout an entire edge-to-cloud network topology or "fog." As another example, some or all of system 100 may be implemented in the cloud (e.g., in a centralized data center). As another example, some or all of system 100 may be implemented at the "edge" of a network, meaning the computing infrastructure exists close to the sources or consumers of data and away from a core of a cloud. In other words, the edge may be located in an area between endpoint devices (e.g., fixed or mobile computing devices, Internet of Things (IoT) devices, smart devices, etc.) and traditional network access points, and may serve as an ingress point into service provider core networks, including carrier networks (e.g., Global System for Mobile Communications (GSM) networks, Long-Term Evolution (LTE) networks, 5G networks, etc.), while also providing storage and/or compute capabilities. By performing certain computations/processing at the edge, efficiencies such as reduced latency, bandwidth, etc., can be realized (e.g., relative to such computations/processing being performed primarily or exclusively at a remote cloud, data center, etc.). Depending on the intended purpose/capabilities of the edge, the edge may include one or more edge computing devices, which may include one or more gateways, servers, multi-access edge computing (MEC) appliances, and so forth. It should be appreciated that, in some embodiments, the edge may form a portion of or otherwise provide an ingress point into a fog network, which may be embodied as a system-level horizontal architecture that distributes resources and services of computing, storage, control, and networking anywhere between a central data center and an endpoint device (e.g., the tenant computing devices 102a-b).

Any, all, or some of the computing devices of computing system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within computing system 100 of FIG. 1 may be utilized in each alternative implementation of the present disclosure. Additionally, one or more of the elements described in connection with the examples of FIG. 1 may be located external to computing system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Additional embodiments associated with the implementation of computing system 100 are described further in connection with the remaining FIGURES. Accordingly, it should be appreciated that computing system 100 of FIG. 1 may be implemented with any aspects of the embodiments described throughout this disclosure.

Figure 2:
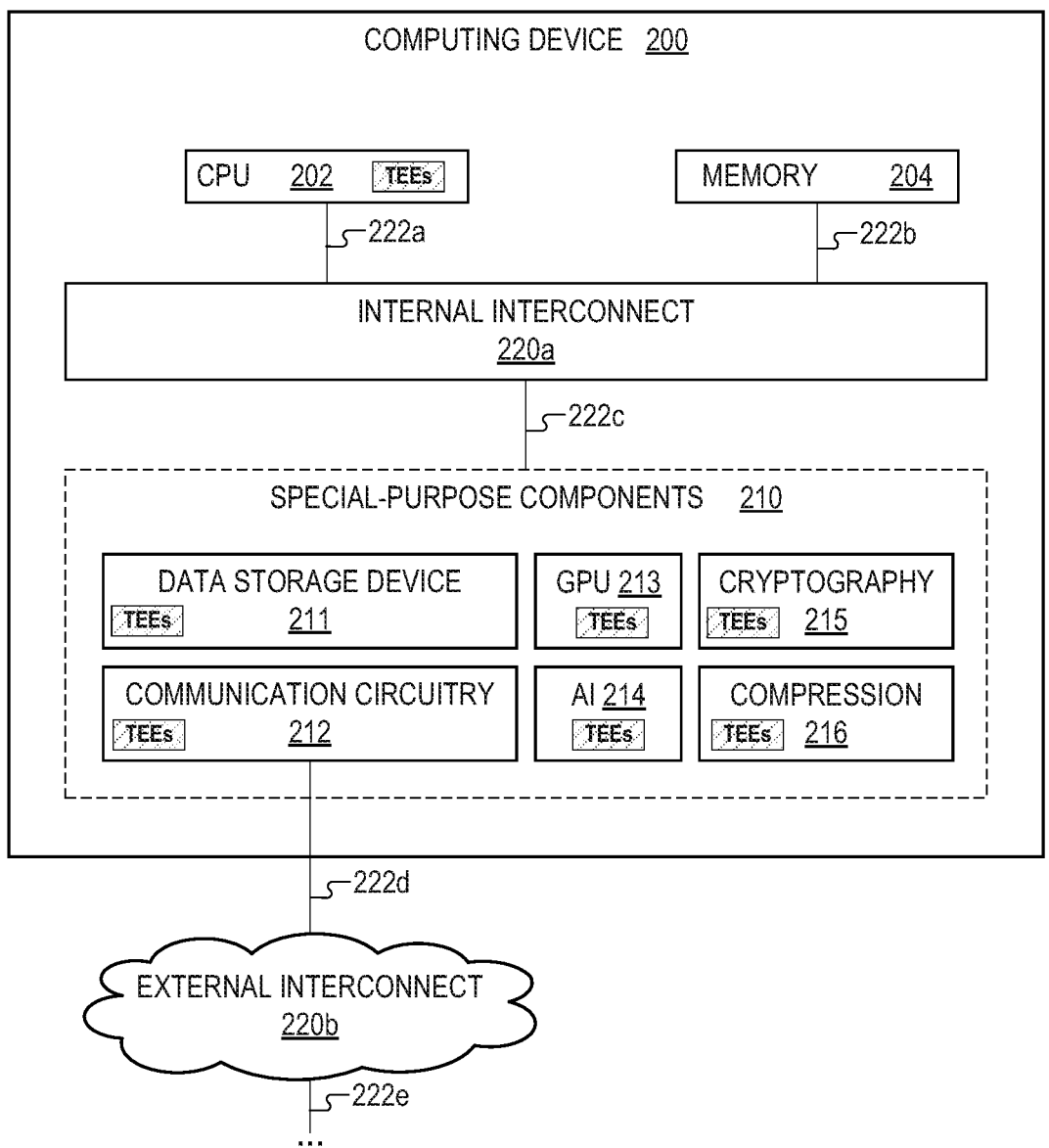
FIG. 2 illustrates an example embodiment of a computing device for implementing CTEE functionality.

FIG. 2 illustrates an example embodiment of a computing device 200 for implementing the composable trustworthy execution environment (CTEE) functionality described throughout this disclosure. In various embodiments, for example, the computing devices described throughout this disclosure (e.g., compute devices 110a-b, orchestrator 104, and/or tenant devices 102a-b of FIG. 1) may include components and/or functionality similar to that of computing device 200.

In the illustrated embodiment, computing device 200 includes a central processing unit (CPU) 202, memory 204, a set of special-purpose computing components or accelerators 210, and interconnect(s) 220, which are described further below. Moreover, computing device 200 may be used to implement one or more composable trustworthy execution environments (CTEEs) in the manner described throughout this disclosure. For example, a CTEE for a particular workload may be implemented by creating secure execution enclaves (SEES) (e.g., trusted execution environments (TEES) and/or hardware-mediated execution enclaves (HMEEs)) on some combination of the CPU 202, the special-purpose computing components 210, and/or other external processing components (not shown) connected to computing device 200 via external interconnect 220b. Moreover, secure (e.g., encrypted) datapaths between the respective enclaves of the CTEE may be established over the interconnects 220a-b and associated links 222a-e that communicatively couple the various processing components used for the CTEE. In addition, data associated with the CTEE that is stored in memory 204 may be encrypted.

The CPU 202 may be used to execute logic and/or instructions designed to implement the functionality described throughout this disclosure. In various embodiments, the CPU 202 may be implemented using any suitable type and/or combination of processing circuitry and/or logic, including general-purpose processors, multi-core processors, microprocessors, microcontrollers, special-purpose processors, accelerators, field-programmable gate arrays (FPGAs), application-specific integrated circuits (ASICs), and/or any other programmable or fixed-function integrated circuits or processing devices.

The memory 204 may be used data and/or instructions used by components of computing device 200 (e.g., data and/or instructions associated with software executed by CPU 202). The memory 204 may be embodied as any type of volatile (e.g., dynamic random access memory (DRAM), etc.) or non-volatile memory or data storage device capable of performing the functions described herein.

Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In some embodiments, the memory 204 may be or may include a block addressable memory device, such as those based on NAND or NOR technologies. The memory 204 may also be or include a three-dimensional crosspoint memory device (e.g., Intel 3D XPoint™ memory), or other byte or bit addressable write-in-place nonvolatile memory devices. In some embodiments, for example, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, the memory 204 may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In various embodiments, all or a portion of the memory 204 may be integrated into the CPU 202 and/or other components of computing device 200.

The special-purpose components 210 include a data storage device 211, a communication circuitry 212, a graphics processing unit (GPU) 213, an artificial intelligence (AI) accelerator 214, a cryptography accelerator 215, and a compression accelerator 216. In some embodiments, these special-purpose components 210 may be characterized as hardware accelerators, as they may include special-purpose processing capabilities designed to accelerate certain functionality for computing device 200. The special-purpose components or accelerators 210 may be implemented using any suitable type and/or combination of circuitry and/or logic, including field-programmable gate arrays (FPGAs), application-specific integrated circuits (ASICs), and/or any other programmable or fixed-function integrated circuits or processing devices.

The data storage device 211 may be used to provide long-term and/or short-term storage of data for computing device 200. In various embodiments, the data storage device 211 may be implemented using any suitable type of device or circuitry for storing data, including any combination of solid-state storage (e.g., flash-based memory or storage, memory cards, solid state drives (SSD)) and/or disk-based storage (e.g., hard disk drives (HDD)), among other examples.

The communication circuitry 212 may be used to communicate with other computing devices or components over a network, such as over external interconnect 220b. In various embodiments, communication circuitry 212 may be implemented using any suitable type and/or combination of circuitry, communication interfaces, and/or communication technologies that enable communication over a network (e.g., wired and/or wirelessly).

In various embodiments, for example, the communication circuitry 212 may be embodied as, or otherwise include, a network interface card or controller (NIC), a host fabric interface (HFI), a modem, a transmitter, a receiver, a transceiver, a transponder, a repeater, a cellular communication circuit, an optical network communication circuit, a microwave communication circuit, a wireless communication circuit, a wired communication circuit, and/or other communication circuit, device, component, or system. The communication circuitry 212 may be configured to communicate via wired and/or wireless network(s) and may use corresponding wireless and/or wired communication protocols. For example, the communication circuitry 212 may be embodied as hardware located on an expansion card connected to a data bus (e.g., internal interconnect 220a) or may be integrated into a motherboard or other component of the computing device 200. The communication circuitry 212 may support interrupt and direct memory access (DMA) interfaces to the host processor (e.g., CPU 202), multiple receive and transmit queues, partitioning or virtualization into multiple logical interfaces, and/or offloading of functions (e.g., transport control protocol (TCP) processing) from the CPU 202. The communication circuitry 212 may include circuitry (e.g., a PHY chip) to implement the physical layer of the Open Systems Interconnection model (e.g., used in Ethernet, Wi-Fi®, Bluetooth®, WiMax, etc.), in which a bitstream is grouped into code words or symbols and converted to a physical signal that is transmitted over a transmission medium, and the data link later, in which data is transferred in frames between adjacent network nodes and errors occurring in the physical layer are detected and corrected. As such, the communication circuitry 212 may provide a base for a full network protocol stack (e.g., the remaining layers of the Open Systems Interconnection model), thus enabling communication between the computing device 200 and other devices over a network.

In some embodiments, for example, the communication circuitry 212 may include a network interface controller (NIC), which may also be referred to as a host fabric interface (HFI). The NIC may be embodied as one or more add-in-boards, daughter cards, network interface cards, controller chips, chipsets, or other devices that may be used by the computing device 200 to connect with another computing device. In some embodiments, the NIC may be embodied as part of a system-on-a-chip (SoC) that includes one or more processors, or included on a multichip package that also contains one or more processors. In some embodiments, the NIC may include a local processor and/or a local memory that are local to the NIC. In such embodiments, the local processor of the NIC may be capable of performing and/or accelerating certain network functions (e.g., a smartNIC). Additionally or alternatively, in such embodiments, the local memory of the NIC may be integrated into one or more components of the computing device 200 at the board level, socket level, chip level, and/or other levels.

The graphics processing unit (GPU) 213, artificial intelligence (AI) accelerator 214, cryptography accelerator 215, and compression accelerator 216 may be respectively used for graphics acceleration, AI acceleration, cryptography acceleration, and compression acceleration.

The components of computing device 200 are communicatively coupled to each other and to other computing devices via interconnects 220a-b and associated links 222a-e. For example, an internal interconnect 220a communicatively couples the components of computing device 200 to each other (e.g., via links 222a-c), and an external interconnect 220b communicatively couples the computing device 200 to other computing devices or components (e.g., via links 222d-e). Interconnects 220a-b and links 222a-e may be embodied as any type and/or combination of circuitry and/or components that facilitate communication among components of computing device 200 and/or other external computing devices.

For example, the internal interconnect 220a may be embodied as, or otherwise include, memory controller hubs, processor interconnects, input/output (I/O) subsystems or controller hubs, peripheral device interconnects and/or controllers, integrated sensor hubs, firmware devices, communication links (e.g., point-to-point links, bus links, wires, cables, light guides, printed circuit board traces, etc.), and/or any other components and subsystems that facilitate communication and/or input/output (I/O) operations. In some embodiments, for example, the internal interconnect 220a may include a Peripheral Component Interconnect Express (PCIe) interconnect, Ultra Path Interconnect (UPI), Quick-Path Interconnect (QPI), Intel Architecture Link (IAL) (e.g., IAL.Cache, IAL.Mem, IAL.IO), Mobile Industry Processor Interface (MIPI), Serial Peripheral Interface (SPI), and/or Universal Serial Bus (USB), among other examples. Moreover, in some embodiments, the internal interconnect 220a may form a portion of a system-on-a-chip (SoC) that incorporates one or more of the CPU 202, the memory 204, and/or any of the special-purpose components or accelerators 210.

As another example, the external interconnect 220b may be embodied as, or otherwise include, any type and/or combination of wired and/or wireless communication link, interconnect, fabric, or network, including switches, routers, bridges, interfaces, links 222, local area networks (LANs), wide area networks (WANs), global networks (e.g., the Internet), cellular networks (e.g., Global System for Mobile Communications (GSM), 3G, 4G Long Term Evolution (LTE), 5G, Worldwide Interoperability for Microwave Access (WiMAX), etc.), radio area networks (RANs), digital subscriber line (DSL) networks, and/or cable networks (e.g., coaxial networks, fiber networks, etc.), among other examples.

In various embodiments, however, the underlying components and functionality of computing device 200 may be combined, separated, and/or distributed across any type and/or number of devices and components. Moreover, in various embodiments, computing device 200 may omit certain components and/or computing device 200 may include additional components that are not shown.

Figure 3:
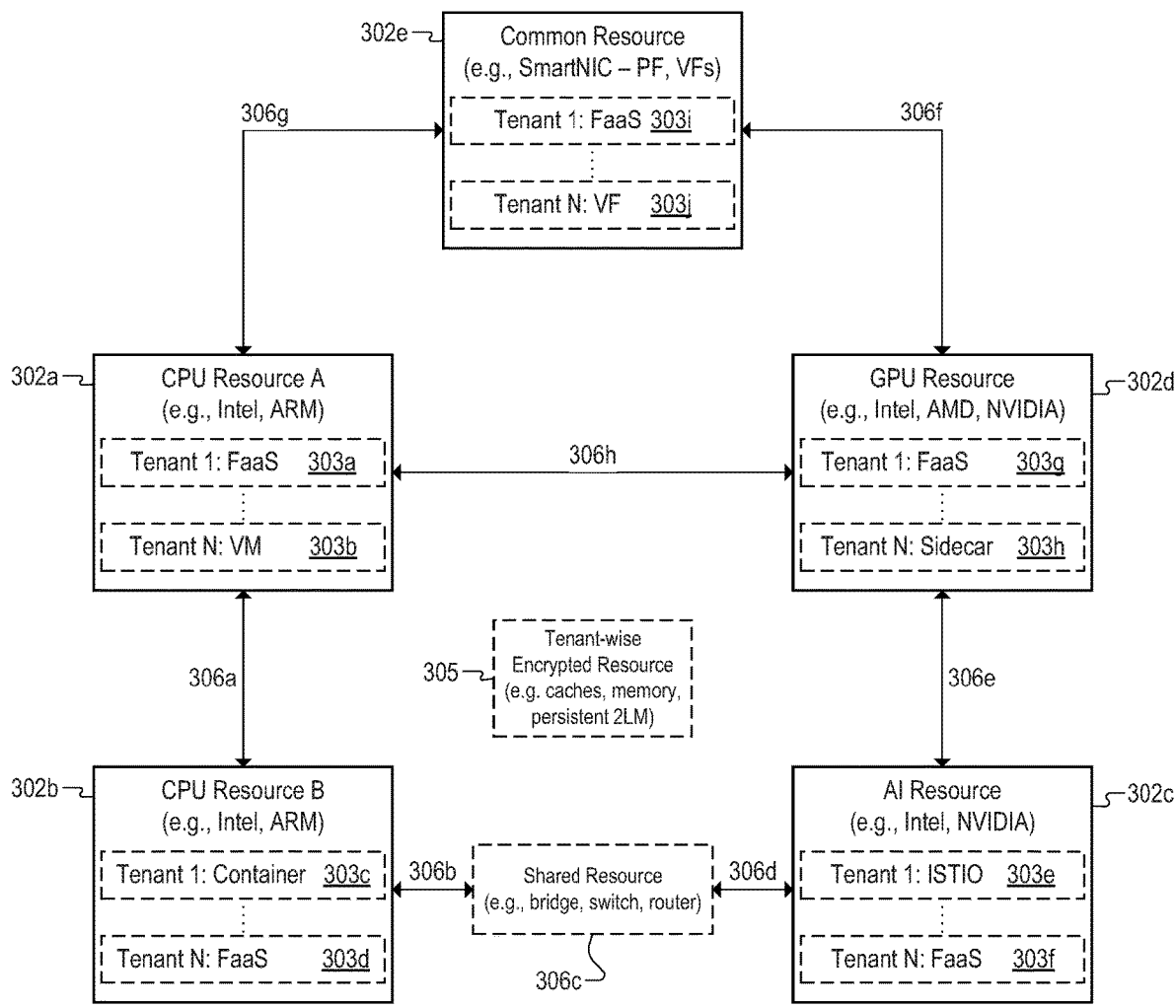
FIG. 3 illustrates an example CTEE configuration on a particular computing platform.

FIG. 3 illustrates an example CTEE configuration on a particular computing platform 300. In various embodiments, the components of computing platform 300 may be implemented and/or distributed across one or more computing devices (e.g., such as computing device(s) that are similar to computing device 200 of FIG. 2).

In the illustrated example, the workloads of multiple different tenants (e.g., tenants 1-N) are executing on computing platform 300, and each of those workloads is executing in its own composable trustworthy execution environment (CTEE). For example, computing platform 300 includes a collection of heterogeneous processing resources 302a-e, which are communicatively coupled to each other via a collection of interconnect resources 306a-h. Moreover, multiple secure execution enclaves 303 are configured on each processing resource 302a-e for the workloads of the different tenants. For example, multiple secure execution enclaves 303a-j are configured on each processing resource 302a-e of computing platform 300, and each enclave 303a-j on a particular processing resource 302a-e is used for a different tenant workload 1-N. In addition, secure datapaths are configured over the interconnect resources 306a-h for communication between enclaves 303 on different processing resources 302a-e that are used for the same tenant workload. In this manner, the CTEE for a particular tenant 1-N includes the set of enclaves 303 across the various processing resources 302a-e for that tenant workload, along with the secure datapaths over the interconnect resources 306a-h. For example, the CTEE for tenant 1 includes enclaves 303a, 303c, 303e, 303g, and 303i, while the CTEE for tenant N includes enclaves 303b, 303d, 303f, 303h, and 304j.

In this manner, computing platform 300 supports islands of secure execution enclaves 303a-j (e.g., TEEs and/or HMEEs) on each processing resource 302a-e, which are interconnected over cryptographically secured interconnects or links 306a-h, thus forming CTEEs for the respective tenant workloads. In the illustrated embodiment, for example, the processing resources include CPU resource A 302a (e.g., an Intel x86 or ARM CPU), CPU resource B 302b (e.g., an Intel x86 or ARM CPU), artificial intelligence (AI) resource 302c (e.g., an Intel or NVIDIA AI accelerator), GPU resource 302d (e.g., an Intel, AMD, or NVIDIA GPU), and common resource 302e (e.g., a SmartNIC for physical and/or virtual network functions). Moreover, these heterogeneous processing resources 302a-e each create logically and physically isolated per-tenant trusted execution environments (TEEs) 330a-j, which collectively form CTEEs for the respective tenant workloads. In this manner, each tenant's software functions will securely execute within the corresponding TEEs across the processing resources 302a-e (regardless of the software form or construction—virtual machines (VMs), virtual network functions (VNFs), Functions-as-a-Service (FaaS), ISTIO service mesh, etc.), and their interconnect messaging traffic (e.g., data, control, and/or management traffic) will go over protected interconnects 306a-h. For example, these inter-component interconnects 306a-h can include but are not limited to PCIe, UPI, QPI, SPI, MIPI, AXI, Infinity Fabric, switched fabrics, network components (e.g., a switch, bridge, and/or router), and/or other industry established and/or proprietary interconnect architectures. The security protocols in this disclosure are applicable to all of the above interconnect technologies. For example, encryption and authentication of traffic on these buses can be leveraged to provide protection between the two end-points of each interconnect 306a-h. Moreover, shared network resources 306c (e.g., switches, bridges, routers) may serve as transport relays and/or may additionally perform packet reordering if they reside within the trust boundary of the tenant workloads. Further, data of the respective tenants that is stored in memory 305 (e.g., caches, main memory or RAM, persistent 2LM) may be encrypted on a per-tenant basis.

Figure 4:
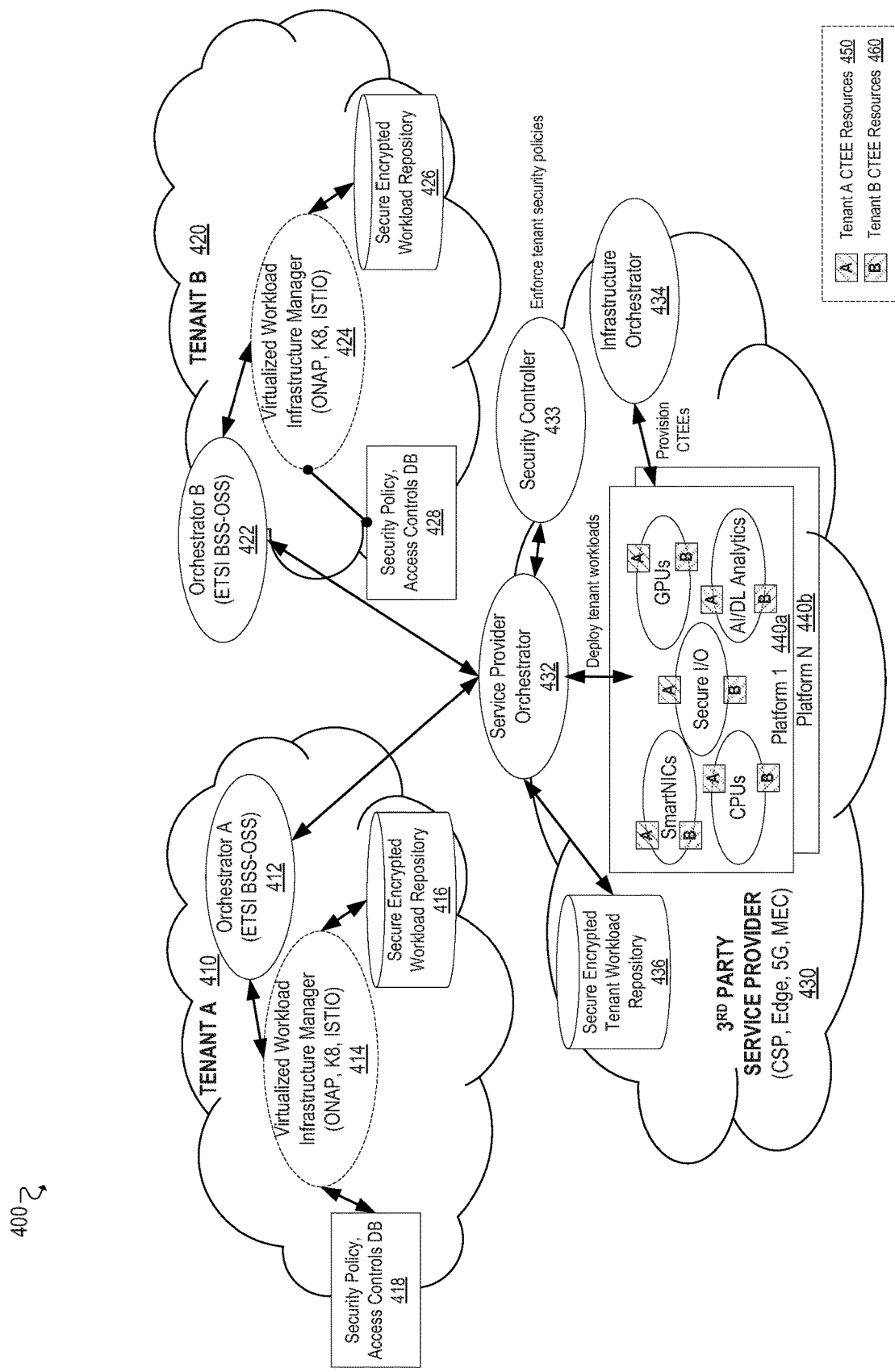
FIG. 4 illustrates an example of a hybrid cloud environment for deploying tenant workloads using CTEEs.

FIG. 4 illustrates an example of a hybrid cloud environment 400 for deploying tenant workloads using composable trustworthy execution environments (CTEEs). For example, each tenant workload is securely executed within a corresponding CTEE, which includes a collection of secure execution environments that are dynamically created, scaled, and distributed across the hybrid cloud environment 400, as described further below.

In the illustrated embodiment, the hybrid cloud environment 400 includes the computing infrastructure of multiple tenants 410, 420 (e.g., tenants A and B) and one or more 3$^{rd}$ party service providers 430. For example, certain computing infrastructure may be deployed on the premises of the respective tenants 410, 420, such as on-premise servers, datacenters, private clouds, enterprise clouds, and so forth. In addition, certain infrastructure may be provided by one or more 3$^{rd}$ party service providers 430, such as providers of cloud services (e.g., cloud service providers (CSPs)), communication services (e.g., communication service providers (CoSPs), cellular service providers, 5G cellular deployments), edge services, multi-access edge computing (MEC), network function virtualization (NFV), and so forth.

Moreover, various workloads of the respective tenants 410, 420 are executed within the hybrid cloud environment 400. For example, certain workloads are executed directly on the infrastructure of the respective tenants 410, 420 (e.g., on-premise, private, and/or enterprise clouds), while other workloads are executed on behalf of the tenants 410, 420 by a $3^{rd}$ party service provider 430 (e.g., a CSP or CoSP).

For example, in order to execute certain workloads directly on the infrastructure of the respective tenants 410, 420, each tenant's infrastructure 410, 420 includes a workload orchestrator 412, 422, virtualized workload infrastructure manager 414, 424, secure encrypted workload repository 416, 426, and security policy and access control database 418, 428.

Moreover, in order to execute certain workloads of the tenants 410, 420 on the infrastructure of the $3^{rd}$ party service provider 430, the service provider (SP) infrastructure 430 includes a workload orchestrator 432, security controller 433, infrastructure orchestrator 434, secure encrypted tenant workload repository 436, and one or more computing platforms 440a-b.

Since workloads executed by the $3^{rd}$ party service provider 430 are outside the control or trust domain of the respective tenants 410, 420, however, those workloads are executed inside CTEEs 450, 460 on the service provider (SP) infrastructure 430, which are secure environments that are created to protect the confidentiality and integrity of the respective workloads.

In some embodiments, for example, the tenants 410, 420 deliver encrypted workloads to the service provider 430 (e.g., a CoSP), the service provider 430 creates separate CTEEs 450, 460 for each tenant 410, 420 on its infrastructure, and the service provider (SP) orchestrator 432 (e.g., a CSP/MEC orchestrator) then deploys those workloads in the corresponding CTEEs 450, 460 for the respective tenants 410, 420.

In particular, the service provider 430 creates the CTEEs 450, 460 on one or more computing platforms 440a-b that are operated or controlled by the service provider 430. In rack scale or datacenter deployments, for example, the computing platforms 440a-b may be part of the same or multiple server racks. Moreover, each computing platform 440a-b includes a variety of heterogeneous computing components, such as CPUs, GPUs, artificial intelligence (AI) and deep learning (DL) engines, SmartNICs, I/O links and interconnects, and/or any other general-purpose or special-purpose computing components. Further, these heterogeneous processing components (e.g., CPUs, GPUs, AI/DL accelerators, SmartNICs) are each capable of creating multiple secure execution enclaves—such as trusted execution environments (TEEs) and/or hardware-mediated execution enclaves (HMEEs)—for the workloads of different tenants. In addition, secure datapaths can be established between these secure enclaves over the I/O links and interconnects that communicatively couple the processing components of the respective computing platforms 440a-b.

In this manner, the service provider 430 can create a CTEE 450, 460 for each tenant 410, 420 that includes a collection of secure execution enclaves (e.g., TEEs, HMEEs) for the particular tenant across various processing components of the computing platforms 440a-b, along with secure datapaths between those enclaves over the I/O links and interconnects of the computing platforms 440a-b. The service provider (SP) security controller 433 provides access control and attestation services to the particular tenant 410, 420 and ensures that the interconnects and network links on the provisioned computing platforms 440a-b are securely configured per the tenant's security policy.

Moreover, as the tenant workloads scale out, the SP orchestrator 432 interoperates with the SP security controller 433 to create additional CTEE resources on the appropriate components of the computing platforms 440a-b (e.g., CPUs, GPUs, accelerators) that are being scaled and managed by the tenant.

In this entire set of orchestration flows, the SP infrastructure 430 (e.g., the CSP, CoSP, and/or edge infrastructure) is outside the trust domain of the respective tenants, and thus the SP infrastructure 430 cannot see or record data, programs, or bus traffic for any tenant workloads that are protected by CTEEs.

Figure 5:
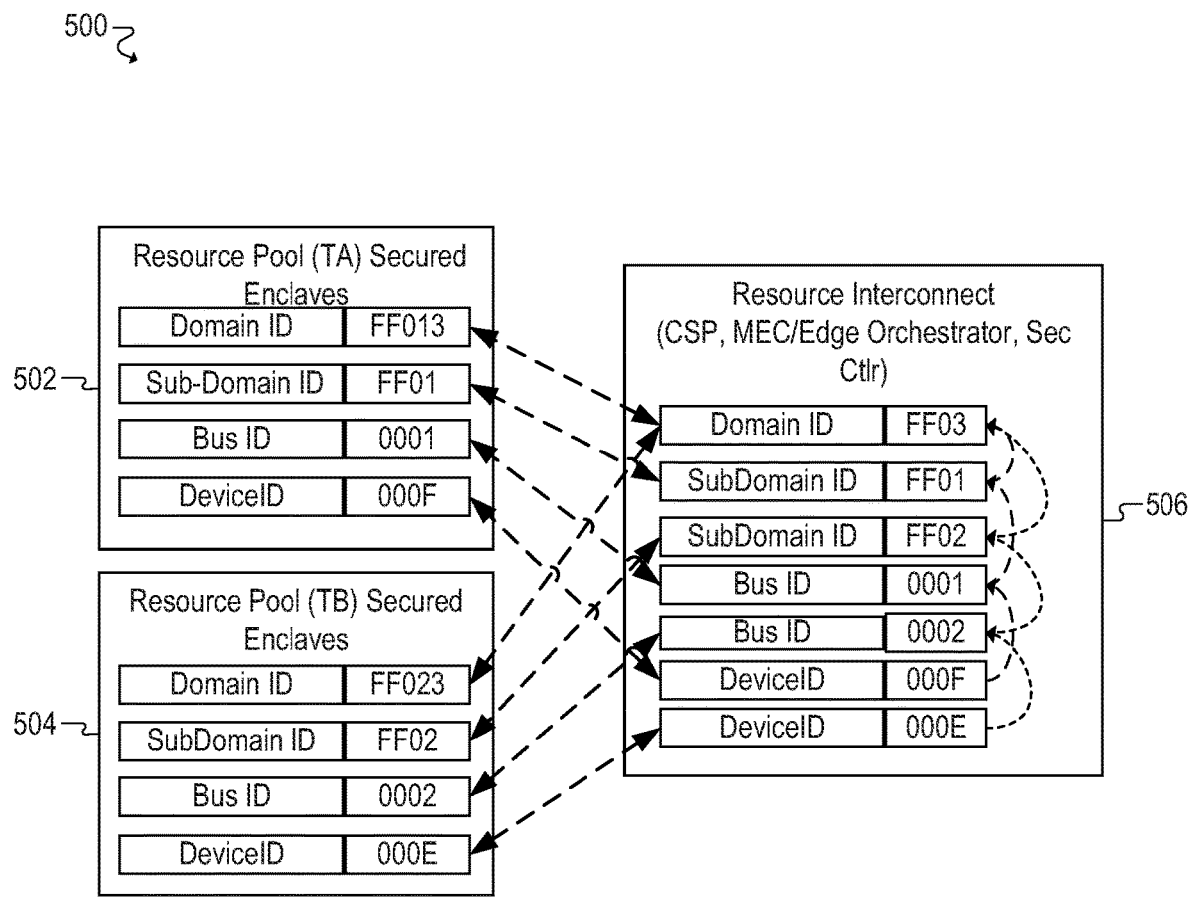
FIG. 5 illustrates an example mapping of CTEE tenant resources.

FIG. 5 illustrates an example mapping 500 of CTEE tenant resources. In some embodiments, for example, the CTEE mapping 500 may be created, maintained, and/or used by an orchestration node that is responsible for deploying tenant workloads in composable trustworthy execution environments (CTEEs).

In the illustrated example, the mapping 500 depicts each tenant's security identities and configuration IDs across the various components that are included in the corresponding CTEE for that tenant. In this manner, the mapping 500 can be used by an orchestrator to create associations among the various secured components in the CTEE for each tenant.

For example, the resource pool for tenant A (reference numeral 502) includes a security CTEE ID, sub-domain ID (e.g., a per-HMEE ID on each processing component), bus ID (e.g., a unique interconnect ID for that tenant), and device ID (e.g., a physical or logical ID of the component with the HMEE). The resource pool for tenant B (reference numeral 504) includes similar information. This mapping 500 is provided for illustrative purposes only, however, and mappings used in other embodiments may include different or additional IDs (e.g., transaction IDs, security policy IDs assigned by a security controller, and so forth).

The orchestrator and/or security controller are responsible for using, managing, and enforcing this mapping 500 for the CTEEs of the respective tenants.

Moreover, the mapping database will be attested to by the trusted hardware root-of-trust, and the mapping 500 will also be delivered to each tenant, which serves as a binding contract with that tenant.

Finally, the mapping 500 will be updated as individual resources scale in/out or up/down per the requirements of the respective workloads, and each update will be signed and attested to for the purpose of establishing an audit trail.

Figure 6:
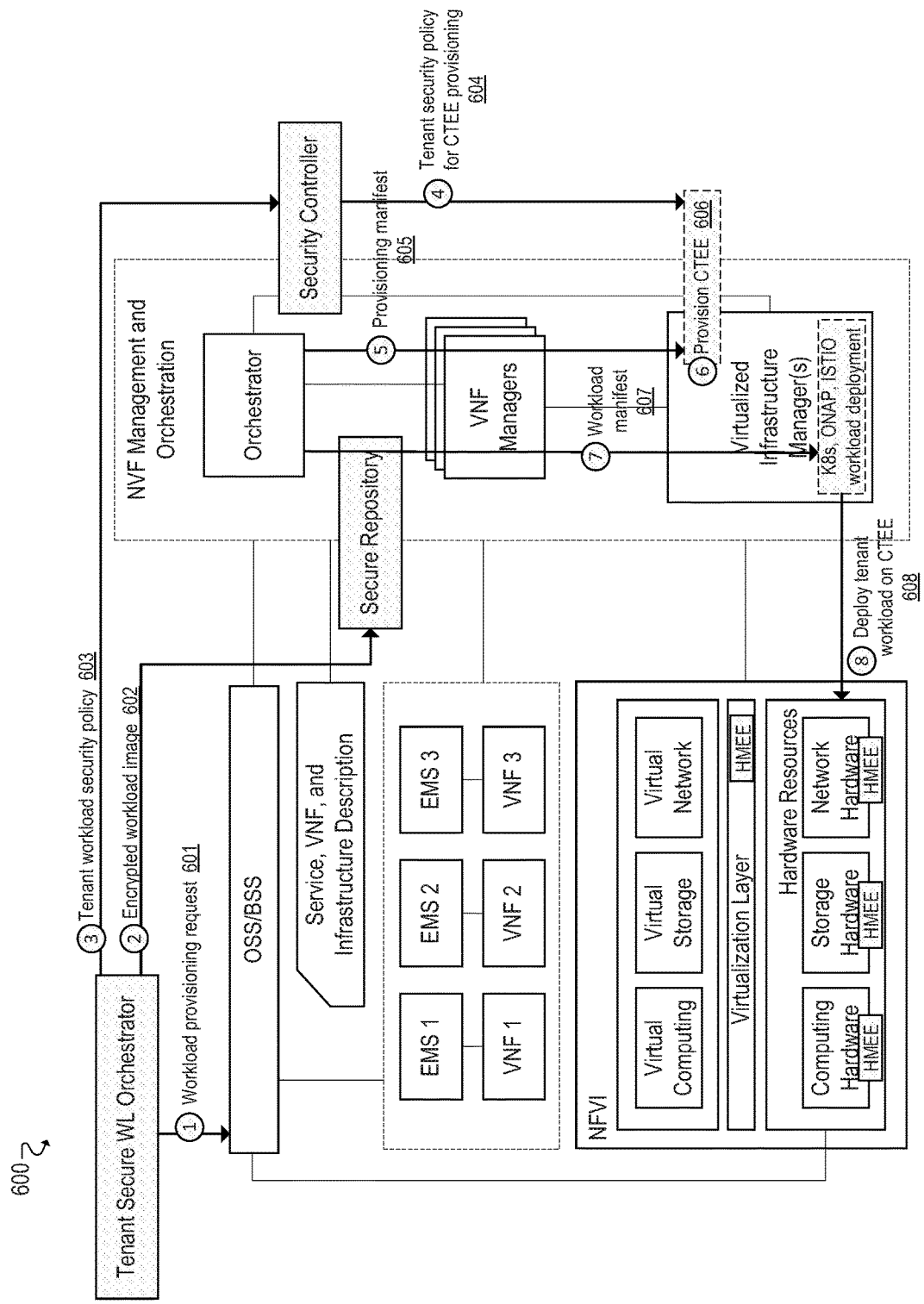
FIG. 6 illustrates an example computing architecture for implementing network function virtualization (NFV) using CTEEs.

FIG. 6 illustrates an example computing architecture 600 for implementing network function virtualization (NFV) using CTEEs. In particular, computing architecture 600 illustrates the applicability of CTEEs to network function virtualization (NFV) in the context of the European Telecommunications Standards Institute (ETSI) NFV standards, along with various extensions for supporting CTEEs in the context of those standards. For example, in some embodiments, certain components of computing architecture 600 may be similar to those from the ETSI Group Specification (GS) NFV standards (e.g., ETSI GS NFV 002, ETSI GS NFV-SEC 013), which are fully incorporated herein by reference. In computing architecture 600, however, the data flows, data structures, and components from the ETSI NFV standards have been updated in order to support for CTEEs.

For example, in the ETSI NFV standards (e.g., ETSI GS NFV-SEC 009), a hardware-mediated execution enclave (HMEE) is an area of process space and memory on a CPU that protects the confidentiality and integrity of instructions and data within the HMEE. In computing architecture 600, however, the concept of HMEEs is extended beyond general-purpose CPUs to any components with processing capabilities, such as GPUs, special-purpose accelerators, SmartNICs, network resources, data storage and security resources, and so forth. Moreover, in computing architecture 600, HMEEs that are created across a variety of heterogeneous processing components can be composed into a composable trustworthy execution environment (CTEE), which can be used to securely execute a heterogeneous workload that is designed to execute across various general-purpose and special-purpose processing components.

In the illustrated embodiment, for example, computing architecture 600 leverages CTEEs to provide full tenant packet processing security for virtual network functions (VNFs) (e.g., based on ETSI NFV standards) that are running on the infrastructure. Computing architecture 600 can be scaled to leverage CTEEs for a variety of virtualized network services, such as virtual Evolved Packet Cores (vEPC), virtual Customer Premises Equipment (vCPE), virtual Broadband Network Gateways (vBNG), and other operator services.

The illustrated example depicts the call flow for deploying a tenant workload on computing architecture 600. The call flow begins with the tenant issuing a workload provisioning request through the operations support system/business support system (OSS/BSS) of the operator (reference numeral 601). The workload provisioning request may include a manifest with a trusted execution policy for the workload (e.g., an HMEE or TEE policy).

The operator then lends access to the orchestrator to allow the tenant to deliver its workload (reference numeral 602) and associated security policy (reference numeral 603), which the orchestrator may then store in a secure repository. For example, the tenant's workload may include an encrypted workload image (e.g., FaaS, containers) with functions to be executed on one or more HMEE-enabled processing components in the operator environment (e.g., CPUs, GPUs, AI accelerators). Moreover, the tenant's security policy for the workload may include a manifest for constructing a CTEE within the operator environment, such as a policy for each HMEE and/or platform component that is to be included in the CTEE.

The orchestrator, security controller, and/or virtualized infrastructure manager (VIM) may then collectively provision the various components and interconnects on the underlying infrastructure to build a CTEE for the workload, as well as procure root-of-trust (RoT) signatures and attestation from those components in order to build a complete CTEE attestation that can be submitted to the tenant for approval.

For example, the security controller generates a security policy for provisioning the CTEE based on the tenant's workload security policy (reference numeral 604), and the orchestrator generates a provisioning manifest for the CTEE (reference numeral 605), both of which are provided to the VIM.

The VIM then provisions the CTEE on the underlying infrastructure based on the CTEE security policy and provisioning manifest provided by the security controller and orchestrator (reference numeral 606). In particular, an HMEE is provisioned on each processing component that is included in the CTEE, and secure datapaths between those HMEEs are provisioned over the interconnects between the respective processing components. The composition of HMEEs and secure datapaths collectively form the CTEE.

Moreover, the orchestrator generates a workload manifest for deploying the workload (reference numeral 607), which is provided to the VIM. Once the tenant verifies and approves the CTEE, the VIM then deploys the tenant workload for execution in the CTEE (reference numeral 608). For example, the workload is deployed for execution in the respective HMEEs that have been created on the underlying processing components of the CTEE. From that time forward, the internal state and data of the workload is protected from inspection and visibility by the infrastructure owner or operator.

Further, audit trails and secure logs will be maintained in secure databases (e.g., as specified in the ETSI NFV-SEC 013 standard), and will be further enhanced to track the policies and status of the secure interconnects used in the CTEEs for the respective tenant workloads, which essentially provide separate cryptographically protected 'lanes' for each tenant workload.

Moreover, a network component such as a bridge, router, or switch may be used to route data from one or more input streams to multiple output streams, and vice versa. When a bridge, router, or switch is included in the trust boundary of the tenants, it is configured to apply different cryptographic protections to different data streams, isolating one data stream from another. For example, a switch may be configured to decrypt each input data stream using a stream-specific cryptographic key, route the data stream according to the routing rules, and re-encrypt the output data stream using the output stream-specific cryptographic key. In addition, a bridge, router, or switch may also perform access control checks for the data (e.g., source ID checking, access control services for PCIe). In other words, the bridge, router, or switch is making independent access control decisions, similar to other HMEEs. In order for the bridge, router, or switch to assist in protecting the CTEE, the bridge, router, or switch is required to attest its trustworthiness to the platform and any remote party. Attestation of the trustworthiness of the bridge, router, or switch includes attestation of its hardware identity and software/firmware identities through cryptographically secure evidence.

When the bridge, router, or switch is not included in the trust boundary, the data link protection originates from the data source and ends on the data sink, using encryption to create a protected and secure tunnel between the data source and the data sink, regardless of whether the protected data stream is routed through a number of other bridges, routers, and/or switches. In this scenario, the bridges, routers, and/or switches in the path of the protected data stream recognize the tunneled data stream and route the data stream from the input to its output, without decrypting and re-encrypting the data stream. Thus, in this scenario, the bridges, routers, and/or switches are not required to attest their trustworthiness to the platform and thus are not included in the trust boundary of the platform.

Figure 7:
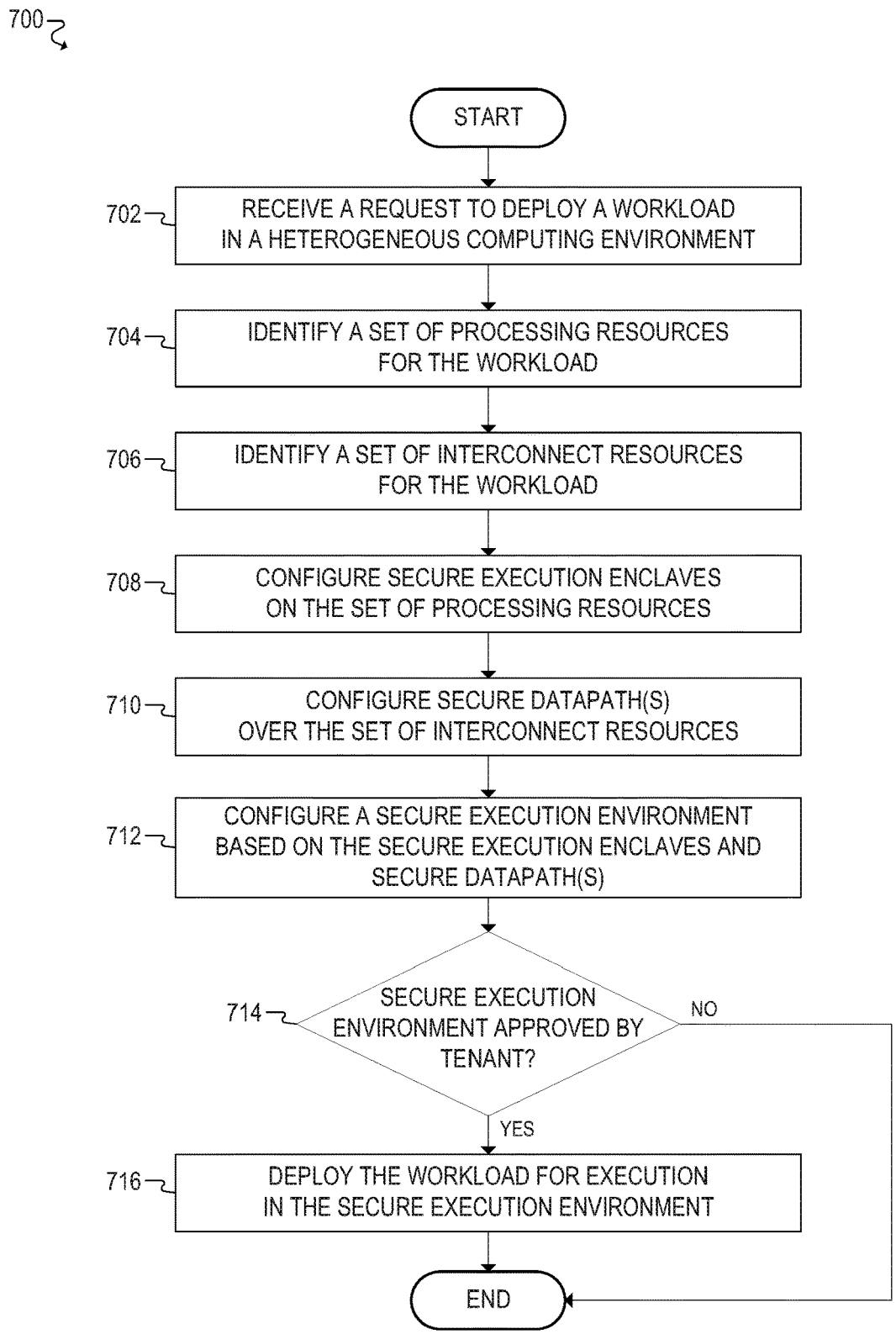
FIG. 7 illustrates a flowchart for an example embodiment of workload orchestration using CTEEs.

FIG. 7 illustrates a flowchart 700 for an example embodiment of workload orchestration using CTEEs. In some cases, for example, flowchart 700 may be implemented using the embodiments and functionality described throughout this disclosure.

For example, flowchart 700 may be implemented by one or more computing devices, platforms, or systems that are used for deploying multi-tenant workloads in a heterogeneous computing environment. In some embodiments, for example, a computing device used for workload orchestration and/or deployment may include a communication interface to communication with a plurality of heterogeneous computing resources associated with the computing environment, and may further include one or more processors to create secure execution environments (e.g., composable trustworthy execution environments or CTEEs) for securely executing workloads of different tenants across those heterogeneous computing resources.

The flowchart begins at block 702, where a request to deploy a workload in a heterogeneous computing environment is received. In some embodiments, for example, the heterogeneous computing environment may include a collection of heterogeneous computing resources (e.g., CPUs, accelerators) that are distributed across one or more computing devices or platforms. Moreover, the workload may be a heterogeneous workload that is designed to execute across various heterogeneous computing resources.

Further, the request may indicate that the workload is to be deployed in a secure execution environment across those heterogeneous computing resources. For example, in some embodiments, the request to deploy the workload may implicitly or explicitly include, or may otherwise trigger, a request to configure a secure execution environment for the workload.

The flowchart then proceeds to block 704 to identify a set of processing resources for the workload. For example, the set of processing resources is identified from the collection of heterogeneous computing resources, and includes one or more CPUs and one or more accelerators. The CPUs may include any general-purpose processor, such as an x86 and/or ARM-based processor. Moreover, the accelerators may include any special-purpose computing component, such as a graphics processing unit (GPU), a network interface controller (e.g., a SmartNIC), an artificial intelligence accelerator, a cryptography accelerator, a compression accelerator, a data storage and security component, and so forth.

The flowchart then proceeds to block 706 to identify a set of interconnect resources for the workload. For example, the set of interconnect resources is identified from the collection of heterogeneous computing resources, and may include any resource used to communicatively couple the set of processing resources, such as a processor interconnect (e.g., UPI, QPI), peripheral component interconnect (e.g., PCIe), network interconnect (e.g., switch, router, bridge), bus, interface, link, and so forth.

The flowchart then proceeds to block 708 to configure secure execution enclaves on the set of processing resources. For example, a secure execution enclave may be configured on each of the processing resources, and each secure execution enclave may provide a cryptographically-isolated execution environment for the workload on the corresponding processing resource. In some embodiments, for example, the secure execution enclaves may be implemented as trusted execution environments (TEES) and/or hardware-mediated execution enclaves (HMEEs).

The flowchart then proceeds to block 710 to configure secure datapath(s) over the set of interconnect resources. For example, the secure datapaths may be cryptographically-protected paths that are established over the interconnect resources to enable communication among the secure execution enclaves during execution of the workload.

The flowchart then proceeds to block 712 to configure a secure execution environment for the workload based on the secure execution enclaves and secure datapath(s). For example, in some embodiments, a composable trustworthy execution environment (CTEE) may be configured for the workload, which may include a composition of the secure execution enclaves (e.g., TEEs, HMEEs) and secure datapaths that have been configured over the processing resources and interconnect resources. In some embodiments, the CTEE may be defined based on a mapping of the respective secure execution enclaves, secure datapaths, processing resources, and interconnect resources that are used to execute the workload.

The flowchart then proceeds to block 714 to determine whether the secure execution environment is approved by the tenant. For example, in some embodiments, the CTEE configuration may be provided to the tenant for approval, which may include root-of-trust (RoT) signatures and attestations for the trustworthiness of each component in the CTEE.

If the tenant does not approve the secure execution environment, the workload may not be deployed, and the flowchart may be complete. Alternatively, in some embodiments, the tenant may request and/or negotiate certain changes to the secure execution environment.

If the tenant approves the secure execution environment (e.g., CTEE), the flowchart then proceeds to block 716 to deploy the workload for execution in the secure execution environment. In this manner, the workload is then securely executed across the various heterogeneous components in the secure execution environment (e.g., CTEE).

Moreover, in some embodiments, a subsequent request may be received to deploy another workload of a different second tenant. Accordingly, another secure execution environment (e.g., CTEE) may be configured for that workload by creating secure execution enclaves (e.g., TEEs, HMEEs) and secure datapaths on the appropriate processing and interconnect resources from the collection of heterogeneous computing resources. Moreover, in some cases, the processing and/or interconnect resources used for different secure execution environments (e.g., CTEEs) may at least partially overlap. Nonetheless, since separate secure execution enclaves (e.g., TEEs, HMEEs) and secure datapaths are configured over those overlapping processing and/or interconnect resources for each secure execution environment (e.g., CTEE), the workloads executed in those secure execution environments (e.g., CTEEs) remain cryptographically isolated from each other and from the underlying infrastructure.

At this point, the flowchart may be complete. In some embodiments, however, the flowchart may restart and/or certain blocks may be repeated. For example, in some embodiments, the flowchart may restart at block 702 to continue receiving and processing requests to deploy workloads in heterogeneous computing environments.

While the present disclosure has been described with respect to a limited number of embodiments, those skilled in the art will appreciate numerous modifications and variations therefrom. It is intended that the appended claims cover all such modifications and variations as falling within the true spirit and scope of this disclosure.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), a field-programmable gate array (FPGA), or a microprocessor, among other examples.

The program code may be implemented in a high level procedural or object-oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

Example Implementations

The following examples pertain to embodiments described throughout this disclosure.

One or more embodiments may include an apparatus, comprising: a communication interface to communicate with a plurality of heterogeneous computing resources associated with a computing environment; and a processor to: receive a request to configure a secure execution environment for a first workload to be deployed within the computing environment; configure a first set of secure execution enclaves for execution of the first workload, wherein the first set of secure execution enclaves is configured on a first set of processing resources from the plurality of heterogeneous computing resources, wherein the first set of processing resources comprises one or more central processing units and one or more accelerators; configure a first set of secure datapaths for communication among the first set of secure execution enclaves during execution of the first workload, wherein the first set of secure datapaths is configured over a first set of interconnect resources from the plurality of heterogeneous computing resources, wherein the first set of interconnect resources communicatively couples the first set of processing resources; and configure the secure execution environment for the first workload, wherein the secure execution environment comprises the first set of secure execution enclaves and the first set of secure datapaths.

In one example embodiment of an apparatus, the processor is further to: receive a request to deploy the first workload; and deploy the first workload for execution within the secure execution environment.

In one example embodiment of an apparatus, the processor is further to: identify, from the plurality of heterogeneous computing resources, the first set of processing resources for the first workload; and identify, from the plurality of heterogeneous computing resources, the first set of interconnect resources for the first workload.

In one example embodiment of an apparatus: each secure execution enclave of the first set of secure execution enclaves comprises a cryptographically-isolated execution environment on a corresponding processing resource of the first set of processing resources; and each secure datapath of the first set of secure datapaths comprises a cryptographically-protected path over one or more interconnect resources of the first set of interconnect resources.

In one example embodiment of an apparatus: the first workload is associated with a first tenant; and the processor is further to: receive a request to configure a second secure execution environment for a second workload to be deployed within the computing environment, wherein the second workload is associated with a second tenant different from the first tenant; configure a second set of secure execution enclaves for execution of the second workload, wherein the second set of secure execution enclaves is configured on a second set of processing resources from the plurality of heterogeneous computing resources, wherein the second set of processing resources at least partially overlaps with the first set of processing resources; configure a second set of secure datapaths for communication among the second set of secure execution enclaves during execution of the second workload, wherein the second set of secure datapaths is configured over a second set of interconnect resources from the plurality of heterogeneous computing resources, wherein the second set of interconnect resources at least partially overlaps with the first set of interconnect resources; and configure the second secure execution environment for the second workload, wherein the second secure execution environment comprises the second set of secure execution enclaves and the second set of secure datapaths.

In one example embodiment of an apparatus: the secure execution environment comprises a composable trustworthy execution environment; and the first set of secure execution enclaves comprises a plurality of trusted execution environments configured on the first set of processing resources.

In one example embodiment of an apparatus, the plurality of trusted execution environments comprises a plurality of hardware-mediated execution enclaves.

In one example embodiment of an apparatus, the one or more accelerators comprise one or more of: a graphics processing unit; a network interface controller; an artificial intelligence accelerator; a cryptography accelerator; or a compression accelerator.

In one example embodiment of an apparatus, the first set of interconnect resources comprises one or more of: a processor interconnect; a peripheral component interconnect; or a network interconnect.

One or more embodiments may include a system, comprising: a plurality of heterogeneous computing resources associated with a computing environment; and one or more processing devices to: receive a request to deploy a first workload within the computing environment; identify, from the plurality of heterogeneous computing resources, a first set of processing resources for the first workload, wherein the first set of processing resources comprises one or more central processing units and one or more accelerators; identify, from the plurality of heterogeneous computing resources, a first set of interconnect resources for the first workload; configure a secure execution environment for the first workload, wherein the secure execution environment comprises: a first set of secure execution enclaves for execution of the first workload, wherein the first set of secure execution enclaves is configured on the first set of processing resources; and a first set of secure datapaths for communication among the first set of processing resources during execution of the first workload, wherein the first set of secure datapaths is configured over the first set of interconnect resources; and deploy the first workload for execution within the secure execution environment.

In one example embodiment of a system: each secure execution enclave of the first set of secure execution enclaves comprises a cryptographically-isolated execution environment on a corresponding processing resource of the first set of processing resources; and each secure datapath of the first set of secure datapaths comprises a cryptographically-protected path over one or more interconnect resources of the first set of interconnect resources.

In one example embodiment of a system: the first workload is associated with a first tenant; and the one or more processing devices are further to: receive a request to deploy a second workload within the computing environment, wherein the second workload is associated with a second tenant different from the first tenant; identify, from the plurality of heterogeneous computing resources, a second set of processing resources for the second workload, wherein the second set of processing resources at least partially overlaps with the first set of processing resources; identify, from the plurality of heterogeneous computing resources, a second set of interconnect resources for the second workload, wherein the second set of interconnect resources at least partially overlaps with the first set of interconnect resources; configure a second secure execution environment for the second workload, wherein the second secure execution environment comprises: a second set of secure execution enclaves for execution of the second workload, wherein the second set of secure execution enclaves is configured on the second set of processing resources; and a second set of secure datapaths for communication among the second set of processing resources during execution of the second workload, wherein the second set of secure datapaths is configured over the second set of interconnect resources; and deploy the second workload for execution within the second secure execution environment.

In one example embodiment of a system, the one or more accelerators comprise one or more of: a graphics processing unit; a network interface controller; an artificial intelligence accelerator; a cryptography accelerator; or a compression accelerator.

In one example embodiment of a system, the first set of interconnect resources comprises one or more of: a processor interconnect; a peripheral component interconnect; or a network interconnect.

In one example embodiment of a system, the peripheral component interconnect comprises a Peripheral Component Interconnect Express (PCIe) interconnect.

In one example embodiment of a system, the network interconnect comprises: a bridge; a router; or a switch.

One or more embodiments may include at least one machine accessible storage medium having instructions stored thereon, wherein the instructions, when executed on a machine, cause the machine to: receive a request to deploy a first workload within a computing environment, wherein the computing environment is associated with a plurality of heterogeneous computing resources; identify, from the plurality of heterogeneous computing resources, a first set of processing resources for the first workload, wherein the first set of processing resources comprises one or more central processing units and one or more accelerators; identify, from the plurality of heterogeneous computing resources, a first set of interconnect resources for the first workload; configure a secure execution environment for the first workload, wherein the secure execution environment comprises: a first set of secure execution enclaves for execution of the first workload, wherein the first set of secure execution enclaves is configured on the first set of processing resources; and a first set of secure datapaths for communication among the first set of processing resources during execution of the first workload, wherein the first set of secure datapaths is configured over the first set of interconnect resources; and deploy the first workload for execution within the secure execution environment.

In one example embodiment of a storage medium: each secure execution enclave of the first set of secure execution enclaves comprises a cryptographically-isolated execution environment on a corresponding processing resource of the first set of processing resources; and each secure datapath of the first set of secure datapaths comprises a cryptographically-protected path over one or more interconnect resources of the first set of interconnect resources.

In one example embodiment of a storage medium, the instructions that cause the machine to configure the secure execution environment for the first workload further cause the machine to: configure the first set of secure execution enclaves on the first set of processing resources, wherein each processing resource of the first set of processing resources is configured with a corresponding secure execution enclave of the first set of secure execution enclaves.

In one example embodiment of a storage medium: the first workload is associated with a first tenant; and the instructions further cause the machine to: receive a request to deploy a second workload within the computing environment, wherein the second workload is associated with a second tenant different from the first tenant; identify, from the plurality of heterogeneous computing resources, a second set of processing resources for the second workload, wherein the second set of processing resources at least partially overlaps with the first set of processing resources; identify, from the plurality of heterogeneous computing resources, a second set of interconnect resources for the second workload, wherein the second set of interconnect resources at least partially overlaps with the first set of interconnect resources; configure a second secure execution environment for the second workload, wherein the second secure execution environment comprises: a second set of secure execution enclaves for execution of the second workload, wherein the second set of secure execution enclaves is configured on the second set of processing resources; and a second set of secure datapaths for communication among the second set of processing resources during execution of the second workload, wherein the second set of secure datapaths is configured over the second set of interconnect resources; and deploy the second workload for execution within the second secure execution environment.

In one example embodiment of a storage medium: the secure execution environment comprises a composable trustworthy execution environment; and the first set of secure execution enclaves comprises a plurality of trusted execution environments configured on the first set of processing resources.

In one example embodiment of a storage medium, the plurality of trusted execution environments comprises a plurality of hardware-mediated execution enclaves.

One or more embodiments may include a method, comprising: receiving a request to deploy a first workload within a computing environment, wherein the computing environment is associated with a plurality of heterogeneous computing resources; identifying, from the plurality of heterogeneous computing resources, a first set of processing resources for the first workload, wherein the first set of processing resources comprises one or more central processing units and one or more accelerators; identifying, from the plurality of heterogeneous computing resources, a first set of interconnect resources for the first workload; configuring a secure execution environment for the first workload, wherein the secure execution environment comprises: a first set of secure execution enclaves for execution of the first workload, wherein the first set of secure execution enclaves is configured on the first set of processing resources; and a first set of secure datapaths for communication among the first set of processing resources during execution of the first workload, wherein the first set of secure datapaths is configured over the first set of interconnect resources; and deploying the first workload for execution within the secure execution environment.

In one example embodiment of a method: each secure execution enclave of the first set of secure execution enclaves comprises a cryptographically-isolated execution environment on a corresponding processing resource of the first set of processing resources; and each secure datapath of the first set of secure datapaths comprises a cryptographically-protected path over one or more interconnect resources of the first set of interconnect resources.

In one example embodiment of a method: the first workload is associated with a first tenant; and the method further comprises: receiving a request to deploy a second workload within the computing environment, wherein the second workload is associated with a second tenant different from the first tenant; identifying, from the plurality of heterogeneous computing resources, a second set of processing resources for the second workload, wherein the second set of processing resources at least partially overlaps with the first set of processing resources; identifying, from the plurality of heterogeneous computing resources, a second set of interconnect resources for the second workload, wherein the second set of interconnect resources at least partially overlaps with the first set of interconnect resources; configuring a second secure execution environment for the second workload, wherein the second secure execution environment comprises: a second set of secure execution enclaves for execution of the second workload, wherein the second set of secure execution enclaves is configured on the second set of processing resources; and a second set of secure datapaths for communication among the second set of processing resources during execution of the second workload, wherein the second set of secure datapaths is configured over the second set of interconnect resources; and deploying the second workload for execution within the second secure execution environment.

What is claimed is:

1. An apparatus, comprising:
  a communication interface to communicate with a plurality of heterogeneous computing resources associated with a computing environment; and
  a processor to:
    receive a request to configure a secure execution environment for a first workload to be deployed within the computing environment;
    configure a first set of secure execution enclaves for execution of the first workload, wherein the first set of secure execution enclaves is configured on a first set of processing resources from the plurality of heterogeneous computing resources, wherein the first set of processing resources comprises one or more central processing units and one or more accelerators;
    configure a first set of secure datapaths for communication among the first set of secure execution enclaves during execution of the first workload, wherein the first set of secure datapaths is configured over a first set of interconnect resources from the plurality of heterogeneous computing resources, wherein the first set of interconnect resources communicatively couples the first set of processing resources; and
    configure the secure execution environment for the first workload, wherein the secure execution environment comprises the first set of secure execution enclaves and the first set of secure datapaths.

2. The apparatus of claim 1, wherein:
  each secure execution enclave of the first set of secure execution enclaves comprises a cryptographically-isolated execution environment on a corresponding processing resource of the first set of processing resources; and each secure datapath of the first set of secure datapaths comprises a cryptographically-protected path over one or more interconnect resources of the first set of interconnect resources.

3. The apparatus of claim 1, wherein:
the secure execution environment comprises a composable trustworthy execution environment; and
the first set of secure execution enclaves comprises a plurality of trusted execution environments configured on the first set of processing resources.

4. The apparatus of claim 3, wherein the plurality of trusted execution environments comprises a plurality of hardware-mediated execution enclaves.

5. The apparatus of claim 1, wherein:
the first workload is associated with a first tenant; and
the processor is further to:
receive a request to configure a second secure execution environment for a second workload to be deployed within the computing environment, wherein the second workload is associated with a second tenant different from the first tenant;
configure a second set of secure execution enclaves for execution of the second workload, wherein the second set of secure execution enclaves is configured on a second set of processing resources from the plurality of heterogeneous computing resources, wherein the second set of processing resources at least partially overlaps with the first set of processing resources;
configure a second set of secure datapaths for communication among the second set of secure execution enclaves during execution of the second workload, wherein the second set of secure datapaths is configured over a second set of interconnect resources from the plurality of heterogeneous computing resources, wherein the second set of interconnect resources at least partially overlaps with the first set of interconnect resources; and
configure the second secure execution environment for the second workload, wherein the second secure execution environment comprises the second set of secure execution enclaves and the second set of secure datapaths.

6. The apparatus of claim 1, wherein the one or more accelerators comprise one or more of:
a graphics processing unit;
a network interface controller;
an artificial intelligence accelerator;
a cryptography accelerator; or
a compression accelerator.

7. The apparatus of claim 1, wherein the first set of interconnect resources comprises one or more of:
a processor interconnect;
a peripheral component interconnect; or
a network interconnect.

8. The apparatus of claim 1, wherein the processor is further to:
receive a request to deploy the first workload; and
deploy the first workload for execution within the secure execution environment.

9. The apparatus of claim 1, wherein the processor is further to:

identify, from the plurality of heterogeneous computing resources, the first set of processing resources for the first workload; and
identify, from the plurality of heterogeneous computing resources, the first set of interconnect resources for the first workload.

10. A system, comprising:
a plurality of heterogeneous computing resources associated with a computing environment; and
one or more processing devices to:
receive a request to deploy a first workload within the computing environment;
identify, from the plurality of heterogeneous computing resources, a first set of processing resources for the first workload, wherein the first set of processing resources comprises one or more central processing units and one or more accelerators;
identify, from the plurality of heterogeneous computing resources, a first set of interconnect resources for the first workload;
configure a secure execution environment for the first workload, wherein the secure execution environment comprises:
a first set of secure execution enclaves for execution of the first workload, wherein the first set of secure execution enclaves is configured on the first set of processing resources; and
a first set of secure datapaths for communication among the first set of processing resources during execution of the first workload, wherein the first set of secure datapaths is configured over the first set of interconnect resources; and
deploy the first workload for execution within the secure execution environment.

11. The system of claim 10, wherein:
each secure execution enclave of the first set of secure execution enclaves comprises a cryptographically-isolated execution environment on a corresponding processing resource of the first set of processing resources; and
each secure datapath of the first set of secure datapaths comprises a cryptographically-protected path over one or more interconnect resources of the first set of interconnect resources.

12. The system of claim 10, wherein:
the first workload is associated with a first tenant; and
the one or more processing devices are further to:
receive a request to deploy a second workload within the computing environment, wherein the second workload is associated with a second tenant different from the first tenant;
identify, from the plurality of heterogeneous computing resources, a second set of processing resources for the second workload, wherein the second set of processing resources at least partially overlaps with the first set of processing resources;
identify, from the plurality of heterogeneous computing resources, a second set of interconnect resources for the second workload, wherein the second set of interconnect resources at least partially overlaps with the first set of interconnect resources;
configure a second secure execution environment for the second workload, wherein the second secure execution environment comprises:
a second set of secure execution enclaves for execution of the second workload, wherein the second set of secure execution enclaves is configured on the second set of processing resources; and
a second set of secure datapaths for communication among the second set of processing resources during execution of the second workload, wherein the second set of secure datapaths is configured over the second set of interconnect resources; and
deploy the second workload for execution within the second secure execution environment.

13. The system of claim 10, wherein the one or more accelerators comprise one or more of:
a graphics processing unit;
a network interface controller;
an artificial intelligence accelerator;
a cryptography accelerator; or
a compression accelerator.

14. The system of claim 10, wherein the first set of interconnect resources comprises one or more of:
a processor interconnect;
a peripheral component interconnect; or
a network interconnect.

15. The system of claim 14, wherein the peripheral component interconnect comprises a Peripheral Component Interconnect Express (PCIe) interconnect.

16. The system of claim 14, wherein the network interconnect comprises:
a bridge;
a router; or
a switch.

17. At least one non-transitory machine accessible storage medium having instructions stored thereon, wherein the instructions, when executed on a machine, cause the machine to: receive a request to deploy a first workload within a computing environment, wherein the computing environment is associated with a plurality of heterogeneous computing resources; identify, from the plurality of heterogeneous computing resources, a first set of processing resources for the first workload, wherein the first set of processing resources comprises one or more central processing units and one or more accelerators; identify, from the plurality of heterogeneous computing resources, a first set of interconnect resources for the first workload; configure a secure execution environment for the first workload, wherein the secure execution environment comprises: a first set of secure execution enclaves for execution of the first workload, wherein the first set of secure execution enclaves is configured on the first set of processing resources; and a first set of secure datapaths for communication among the first set of processing resources during execution of the first workload, wherein the first set of secure datapaths is configured over the first set of interconnect resources; and deploy the first workload for execution within the secure execution environment.

18. The storage medium of claim 17, wherein:
each secure execution enclave of the first set of secure execution enclaves comprises a cryptographically-isolated execution environment on a corresponding processing resource of the first set of processing resources; and
each secure datapath of the first set of secure datapaths comprises a cryptographically-protected path over one or more interconnect resources of the first set of interconnect resources.

19. The storage medium of claim 17, wherein the instructions that cause the machine to configure the secure execution environment for the first workload further cause the machine to:
configure the first set of secure execution enclaves on the first set of processing resources, wherein each processing resource of the first set of processing resources is configured with a corresponding secure execution enclave of the first set of secure execution enclaves.

20. The storage medium of claim 17, wherein:
the first workload is associated with a first tenant; and
the instructions further cause the machine to:
receive a request to deploy a second workload within the computing environment, wherein the second workload is associated with a second tenant different from the first tenant;
identify, from the plurality of heterogeneous computing resources, a second set of processing resources for the second workload, wherein the second set of processing resources at least partially overlaps with the first set of processing resources;
identify, from the plurality of heterogeneous computing resources, a second set of interconnect resources for the second workload, wherein the second set of interconnect resources at least partially overlaps with the first set of interconnect resources;
configure a second secure execution environment for the second workload, wherein the second secure execution environment comprises:
a second set of secure execution enclaves for execution of the second workload, wherein the second set of secure execution enclaves is configured on the second set of processing resources; and
a second set of secure datapaths for communication among the second set of processing resources during execution of the second workload, wherein the second set of secure datapaths is configured over the second set of interconnect resources; and
deploy the second workload for execution within the second secure execution environment.

21. The storage medium of claim 17, wherein:
the secure execution environment comprises a composable trustworthy execution environment; and
the first set of secure execution enclaves comprises a plurality of trusted execution environments configured on the first set of processing resources.

22. The storage medium of claim 21, wherein the plurality of trusted execution environments comprises a plurality of hardware-mediated execution enclaves.

23. A method, comprising:
receiving a request to deploy a first workload within a computing environment, wherein the computing environment is associated with a plurality of heterogeneous computing resources;
identifying, from the plurality of heterogeneous computing resources, a first set of processing resources for the first workload, wherein the first set of processing resources comprises one or more central processing units and one or more accelerators;
identifying, from the plurality of heterogeneous computing resources, a first set of interconnect resources for the first workload;
configuring a secure execution environment for the first workload, wherein the secure execution environment comprises:
a first set of secure execution enclaves for execution of the first workload, wherein the first set of secure execution enclaves is configured on the first set of processing resources; and
a first set of secure datapaths for communication among the first set of processing resources during execution of the first workload, wherein the first set of secure datapaths is configured over the first set of interconnect resources; and deploying the first workload for execution within the secure execution environment.

24. The method of claim 23, wherein:

each secure execution enclave of the first set of secure execution enclaves comprises a cryptographically-isolated execution environment on a corresponding processing resource of the first set of processing resources; and each secure datapath of the first set of secure datapaths comprises a cryptographically-protected path over one or more interconnect resources of the first set of interconnect resources.

25. The method of claim 23, wherein:

the first workload is associated with a first tenant; and the method further comprises:

receiving a request to deploy a second workload within the computing environment, wherein the second workload is associated with a second tenant different from the first tenant;

identifying, from the plurality of heterogeneous computing resources, a second set of processing resources for the second workload, wherein the second set of processing resources at least partially overlaps with the first set of processing resources;

identifying, from the plurality of heterogeneous computing resources, a second set of interconnect resources for the second workload, wherein the second set of interconnect resources at least partially overlaps with the first set of interconnect resources;

configuring a second secure execution environment for the second workload, wherein the second secure execution environment comprises:

a second set of secure execution enclaves for execution of the second workload, wherein the second set of secure execution enclaves is configured on the second set of processing resources; and a second set of secure datapaths for communication among the second set of processing resources during execution of the second workload, wherein the second set of secure datapaths is configured over the second set of interconnect resources; and deploying the second workload for execution within the second secure execution environment.

\* \* \* \* \*